(12) United States Patent
Pottier et al.

(10) Patent No.: US 12,554,887 B2
(45) Date of Patent: Feb. 17, 2026

(54) METHODS AND APPARATUS FOR AMBIENT COMPUTING

(71) Applicant: Arm Limited, Cambridge (GB)

(72) Inventors: Remy Pottier, Grenoble (FR); Nicholas John Cook, Kenilworth (GB); Vasileios Laganakos, Saffron Walden (GB); Diya Soubra, Nice (FR)

(73) Assignee: Arm Limited, Cambridge (GB)

( * ) Notice: Subject to any disclaimer, the term of this patent is extended or adjusted under 35 U.S.C. 154(b) by 119 days.

(21) Appl. No.: 18/430,950

(22) Filed: Feb. 2, 2024

(65) Prior Publication Data
US 2025/0165647 A1    May 22, 2025

(30) Foreign Application Priority Data
Nov. 22, 2023  (EP) ..................................... 23386119

(51) Int. Cl.
*G06F 21/62* (2013.01)
*G06F 21/60* (2013.01)

(52) U.S. Cl.
CPC ........ *G06F 21/6254* (2013.01); *G06F 21/606* (2013.01)

(58) Field of Classification Search
CPC .. G06F 21/602; G06F 21/604; G06F 21/6218; G06F 21/6245–6263; H04L 63/0407–0421; H04L 63/20
See application file for complete search history.

(56) References Cited

U.S. PATENT DOCUMENTS

| | | | |
|---|---|---|---|
| 2019/0036887 A1* | 1/2019 | Miller | G07C 9/20 |
| 2019/0319932 A1* | 10/2019 | Kandregula | H04L 67/306 |
| 2020/0275266 A1* | 8/2020 | Jakobsson | H04W 4/90 |

* cited by examiner

*Primary Examiner* — Kevin Bechtel
(74) *Attorney, Agent, or Firm* — Leveque Intellectual Property Law, P.C.

(57) ABSTRACT

A method of operating a personal intelligent agent in an ambient computing environment, comprising receiving input; analyzing input to derive a user personal preference; associating the personal preference with a first context indicator; determining whether the personal preference is exposable; responsive to determining that the personal preference is exposable, storing the preference with the associated context indicator; detecting when the agent enters a detectable context and responsively creating a second context indicator; determining if there is a match between the second and the first context indicator; retrieving the exposable personal preference associated with the context indicator; creating an anonymous preference indicator comprising the exposable personal preference with the matched context; emitting the preference indicator over the ambient computing environment; and monitoring the ambient computing environment to detect any broadcast message indicating ability to satisfy the preference shown in the preference indicator.

20 Claims, 5 Drawing Sheets

ND APPARATUS FOR AMBIENT
COMPUTING

The present technology relates to data processing and data processing apparatuses and systems, and more particularly to the operation of intelligent agents in ambient (or ubiquitous) computing environments.

The term "ambient computing" refers to a development in the field of computing in which many devices (including devices not originally developed for computing purposes) are equipped with the capacity to process at least some data and to communicate with one another in networks, typically in networks permitting mobile and intermittent communication links, such that roving devices may interconnect and cooperate with other, roving or static, devices to perform tasks on behalf of users.

In a simple example of ambient computing, various retail outlets in a shopping mall may be equipped with relatively short range wireless transceivers to create zones within which a user's roving device may form ad hoc, or temporary, communications links with the various retail outlets as they pass into the relevant zones, so that a user may be, for example, provided with information about current stock availability, offers of goods or services and the like, and in which the user may perform responsive actions, such as reserving goods or pre-booking a service. Further, the user's roving device may also be operable to form such temporary links with other roving or static devices to perform desirable actions on behalf of users.

As will be clear to one of ordinary skill in the art, this is merely one example of the possibilities in ambient computing, and many other examples will be immediately apparent.

As will also be immediately apparent to one of ordinary skill in the art, the advantages of ambient computing environments come with potential disadvantages, not the least of which is that there is a risk that information that the user may wish to keep private may become exposed in such an environment, especially when there has been no preceding privacy or security arrangement, such as a secured transaction protocol, performed between a user's roving device and the other devices in the environment.

The present technology relates to the control of intelligent agents and the potential responders to intelligent agents in an ambient computing environment.

According to a first implementation of the present technology, there is provided a method of operating a personal intelligent agent in an ambient computing environment, comprising receiving at least one input from at least one source; analyzing the at least one input to derive a personal preference of a user of the personal intelligent agent; associating the at least one personal preference with a first context indicator defining a context of the at least one input; determining whether the at least one personal preference is exposable according to an applicable level of privacy in a graded privacy scheme; responsive to determining that the at least one personal preference is exposable, storing the personal preference as an exposable personal preference with the associated first context indicator in a dedicated store indexed by context indicator; detecting when the personal intelligent agent enters a detectable context and responsively creating a second context indicator; determining if there is a match between the second context indicator and the first context indicator in the dedicated store; retrieving the exposable personal preference associated with the matched context indicator; creating an anonymous preference indicator comprising the exposable personal preference associated with the matched context indicator; emitting the anonymous preference indicator anonymously over a communication medium of the ambient computing environment; and monitoring the ambient computing environment to detect any broadcast message that indicates ability to satisfy the preference shown in the anonymous preference indicator.

According to a second implementation of the present technology, there is provided a method of operating an ambient computing environment with a communications network having at least intermittent communication with at least one personal intelligent agent, comprising monitoring the ambient computing environment to detect a message comprising an anonymous preference indicator; responsive to detecting a message comprising an anonymous preference indicator, analysing the exposed personal preference and the associated context indicator; determining that a current local context matches the associated context indicator; responsive to determining that the current local context matches the associated context indicator, determining whether the exposed personal preference can be satisfied by a provider in the ambient computing environment; and responsive to determining that the exposable personal preference can be satisfied, broadcasting over a communications medium of the ambient computing environment an offer to satisfy the exposed personal preference.

In a further implementation, there may be provided a computer program comprising computer program code to, when loaded into a processor and executed thereon, cause the processor to perform the method according to an implementation of the present technology. The computer program may be embodied as a non-transitory computer-readable medium comprising computer program instructions to when loaded into a processor and executed thereon, cause the processor to perform the method according to an implementation of the present technology. In a variant, there may be provided a computer program operable to adapt a host processing system to provide an execution environment permitting operation of non-native processor instructions to perform the steps of the method according to an implementation of the present technology.

Implementations of the present technology are diagrammatically illustrated, by way of example, in the accompanying drawings, in which.

As described above, ambient computing environments according to the present technology may be operated in a conventional manner, wherein a human user interacts with an ambient computing environment by way of a device, such as a mobile (cellular) phone or an augmented reality device, to perform actions such as ordering or purchasing goods or services, booking a facility, such as a restaurant table or a hotel room, or the like. In an alternative, a user's device may be equipped with an intelligent agent that is operable to interoperate with other entities in the ambient computing environment to perform useful actions on behalf of a user using some form of built-in artificial intelligence, while maintaining appropriate protection for personally identifiable information or other information which a user might not wish to be disseminated. The built-in artificial intelligence may, for example, take the form of a trained rules-based expert system or an artificial neural network system.

The built-in artificial intelligence may operate to accept inputs from, for example, augmented reality (AR) devices, such as AR headsets or AR glasses, from sensors, including for example, implanted devices, and from other data sources, such as previously stored personal data, possibly comprising history-based preference data for a user, time-series behaviour data indicating user intentions, and the like. For example, a user of an AR device equipped with an agent of the present technology may walk through a shopping mall and towards a food hall area. The agent detects that the user's attention is not directed to any of the shops, but is focused on the food hall. The agent applies its artificial intelligence capabilities and infers that the user is interested in getting food in the food hall area; the agent retrieves some history relating to the user's past food likes and dislikes and constructs an anonymised exposable personal preference, which is then broadcast to the ambient computing environment. The anonymised exposable personal preference may, for example, have any personally-identifiable information redacted or obscured, but may further have any details that might lead to any form of user profiling also redacted or obscured. The anonymised exposable personal preference may further have an associated context within which it may be emitted—for example, preferences for leisure activities may be associated with particular location contexts, while food preferences may be associated with conventional meal-time temporal contexts. In other variants, leisure activity preferences may be actively suppressed during worktime temporal contexts, or within working geographical zones.

The broadcast anonymised exposable personal preference is thus emitted into the ambient computing environment, in which other devices that are connected, for example, devices that have a wireless reception zone established, may become aware of the broadcast. In some such devices, there may be a further type of agent, called a responder. Such a responder may then receive the broadcast, analyze the anonymised exposable personal preference and determine (for example, by querying the food outlet's systems) that the expressed preference for types of food may be satisfied in three of the food outlets in the food hall area, and that tables are available in two of those outlets at the time of asking. The responder may then message the user with information about the availability of suitable food and free tables, to enable the user to, for example, choose a restaurant and reserve a table in advance of arrival.

Figure 1:
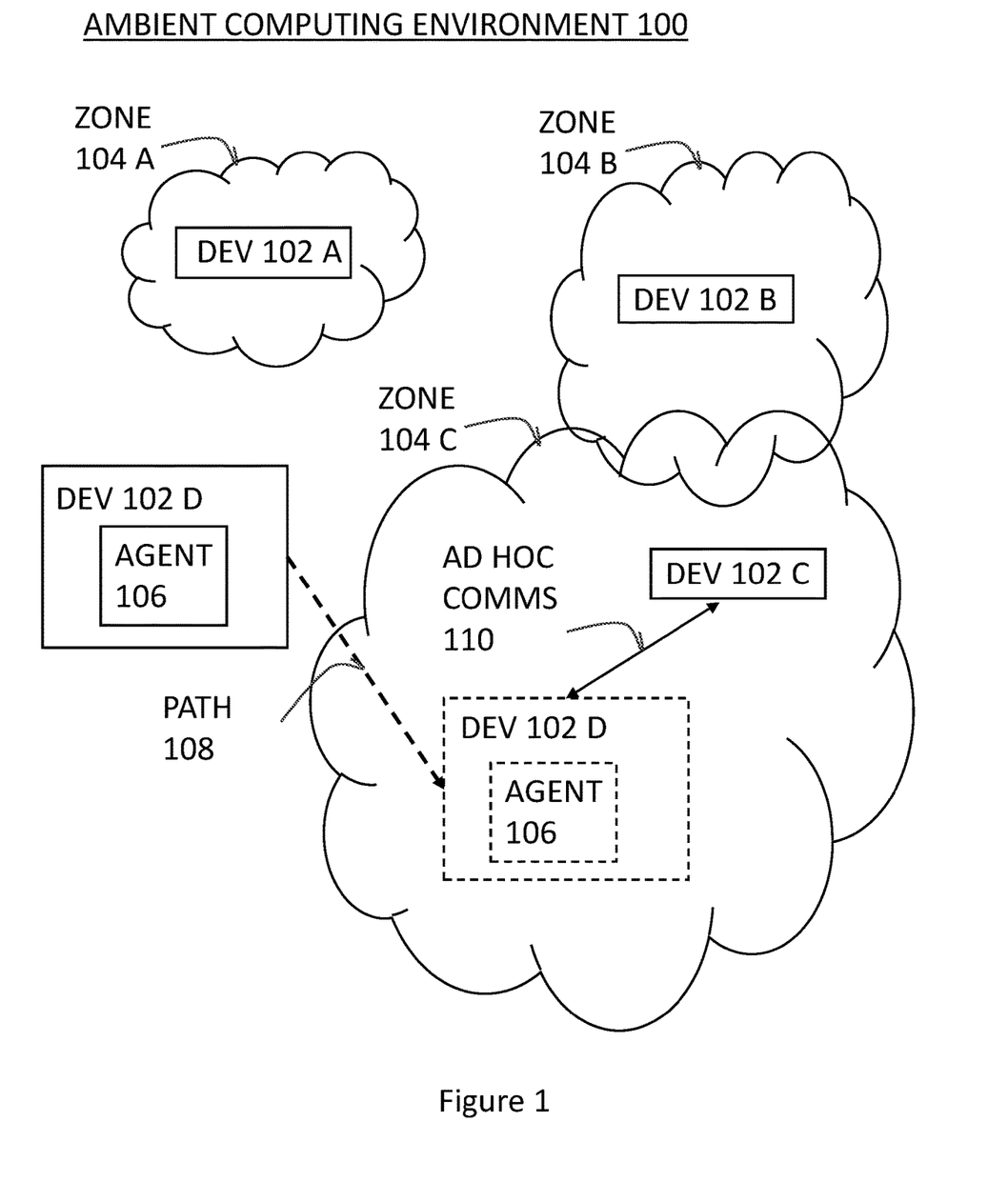
FIG. 1 schematically shows a simplified block diagram of one possible ambient computing environment within which implementations of the present technology may operate.

For a better understanding of the environments within which the present technology may be implemented, FIG. 1 shows one possible example of an ambient computing environment 100. In ambient computing environment 100, devices 102 A, 102 B, and 102C are operable to establish zones, respectively 104 A, 104 B and 104 C. Zones 104 A, 104 B and 104 C may comprise wireless communication zones, which may, for example, be implemented using wireless local area network (Wi-Fi), short range communication such as radio frequency communication (RFID) or near field communication (NFC), or other communications means used in wireless sensor networks such as ZigBee or Bluetooth, Bluetooth Low Energy (BLE) or 6LoWPAN, using any suitable communications protocol such as the lightweight machine-to-machine communications protocol (LWM2M). Clearly, devices 102 A, 102 B, 102C may also communicate in other contexts, for various purposes, and by various other communications means, including, for example, wired or longer-range wireless means, including cellular telephone networks using 4G and 5G protocols, and they may be connected to grids, meshes, and local and wide area networks including private LANs and the Internet.

As will be clear to one of ordinary skill in the art, devices 102 A, 102 B, 102 C may be static or mobile devices, and thus the respective zones may also be static or mobile. Device 102 D shown in FIG. 1 is a mobile device, and is thus capable of passing from the exterior of any zone to the interior of that zone, as shown here by the dotted arrow of path 108, where device 102 D passes into zone 104 C. Device 102 D is thus additionally shown in a dotted box form inside zone 104 C. Device 102 D may operable, like devices 102 A, 102 B, 102C, to use any of the various communications channels available to mobile devices.

Device 102 D is provided with intelligent agent 106, which is a software, firmware or hardware component operable to act on behalf of the user of device 102 D. For example, intelligent agent 106 may be operable to establish ad hoc (or temporary) communications paths to other entities equipped with transceiver technologies, in order to act on behalf of the user of device 102 D. In a real-world example, intelligent agent 106 may be operable to emit queries to connected devices to obtain information or to perform other services, such as reserving a table in a restaurant or ordering goods, on behalf of the user of device 102 D.

When a device, such as device 102 D enters a zone such as zone 104 C, it can establish an ad hoc (temporary) communications connection (ad hoc comms 110) with the device that owns the zone, in this case, device 102 C, which owns zone 104 C. During the period when device 102 D is within zone 104 C, it can maintain the communication with device 102 C using ad hoc comms path 110, so that agent 106 can perform activities on behalf of the user in conjunction with services provided by device 102 C and any further connected devices. Of course, the arrangement shown in FIG. 1 has been much simplified; in any real-world scenario, many zones may overlap and coincide, such that agent 106 can perform activities on behalf of the user with many accessible devices.

Figure 2:
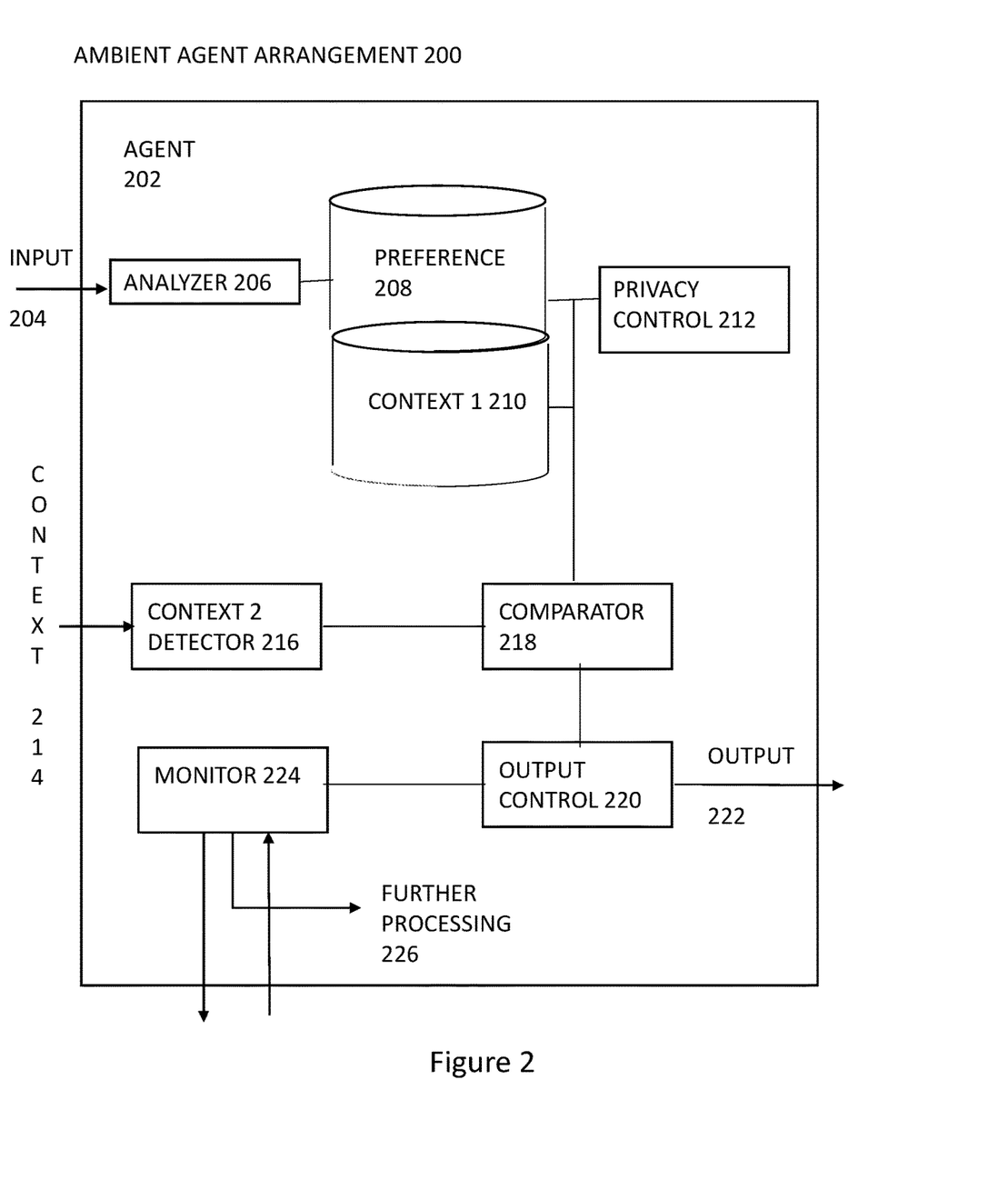
FIG. 2 illustratively shows a block diagram of an ambient agent arrangement according to an implementation of the present technology.

Turning now to FIG. 2, there is shown an example of an ambient agent arrangement 200 according to an implementation of the present technology. In this arrangement, agent 202 is operable to receive inputs from many sources, including, for example, diary scheduling applications, shopping list and history applications, sensors operable to detect motion through a geography, and the like. Agent 202 is provided with an analyzer 206, operable to analyze inputs to determine a user's preferences and to store them in a preference store 208, along with any related information about the context in which such preferences are applicable, wherein this first context is stored in context 1 store 210. Preferences in preference store 208 are subject to control by a privacy control component 212, which is operable to determine the circumstances and contexts in which a preference may be exposed over a communications medium without betraying personally identifiable information or other information that should not be so exposed.

Agent 202 is further provided with context 2 detector 216, which is operable to monitor an ambient environment and detect a context 214 comprising one or more communication zones within which its host device is located. Context 2 detector 216 is operable to pass the context 2 information to comparator 218, which cooperates with privacy control 212 to determine whether context 2 meets the conditions established for context 1, such that the preference may be exposed in context 2 without betraying personally identifiable information or other information that should not be so exposed. Comparator 218 passes the result to output control 220, which is operable to construct an appropriate broadcast signal comprising the thus anonymised exposable personal preference as output 222 to the ambient environment. Output control is further operable to activate monitor 224 with suitable information to enable monitor 224 to monitor the ambient environment for responses to the broadcast signal output 222, and to pass any ensuing monitoring results to further processing 226.

In this manner, the present technology provides a method of hyper-personalization with guaranteed privacy without prior interaction between parties, with various degrees of service, in response to a given context/situation. The personal preference information is protected within a personal data store by "sandboxing" the preference information until it can be processed for selective disclosure while maintaining privacy. The personal data can then be operated upon by an agent in the form of preference creation engine able to create a representation of the preference using, for example, a known ontology and runtime contextual/personal data. The agent may be operable, for example, to take input signals from augmented reality glasses or other sensor fusion engines to detect user intentions, as well as data from a user's bio-sensors, along with preferences stored in the personal data store. The agent may be provided with a privacy controller having a set of rules to determine what information may expose personally identifiable details of the user, or which might lead to some form of profiling. The agent may then redact or obscure such information to anonymise the preference information, so that it is suitable for emission into the ambient computing environment. Based on the suitably treated information, the agent may then be operable to trigger broadcasting of an anonymised exposable personal preference through wireless communication.

The ambient computing environment of the present technology comprises ambient agent arrangements in user devices as described above and responder arrangements, which may be incorporated into various forms of static or mobile devices. These responders may be themselves operable to offer goods and services, or they may act as repositories or forwarders of anonymised exposable personal preferences, requests and offers on behalf of others. For example, there may be provided a system of "brokers" in the ambient computing environment, wherein the brokers operate as recipients of broadcast preferences and themselves elicit and broadcast responsive offers into the ambient computing environment.

Figure 3:
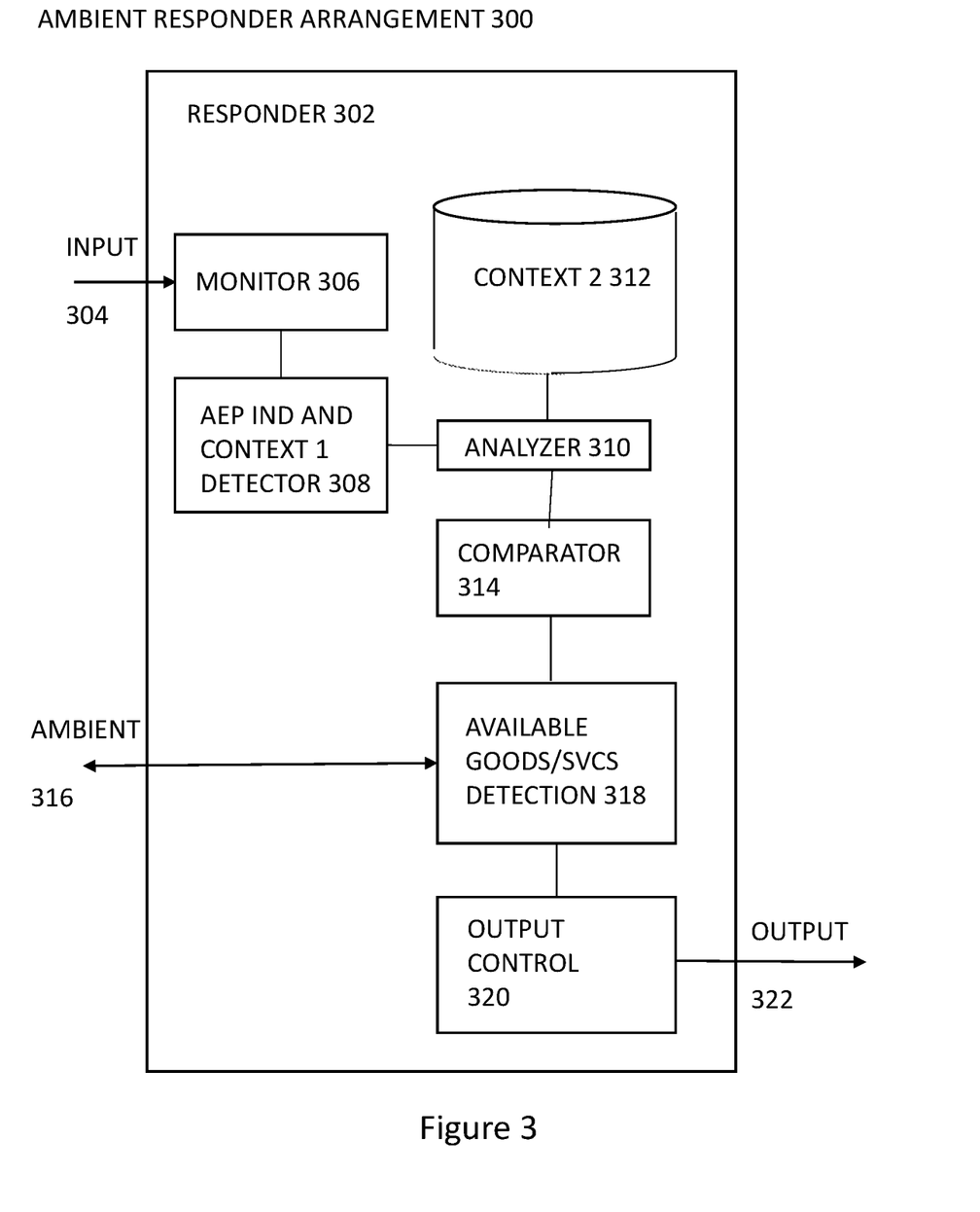
FIG. 3 illustratively shows a block diagram of an ambient responder arrangement according to an implementation of the present technology.

Turning to FIG. 3, there is shown a block diagram of an ambient responder arrangement 300 according to one possible implementation of the present technology. In FIG. 3, responder 302 is equipped with a monitor 306 in communication with at least a portion of an ambient computing environment and operable to receive inputs 304 and to detect, in conjunction with an anonymized exposable personal preference indicator (AEP IND and context 1) detector 308, that a broadcast contains anonymised exposable personal preference indicators comprising preference and context 1 information from an agent in the ambient computing environment. "Context 1" represents the context information associated with the user's preference and emitted into the ambient computing environment in association with the anonymised exposable personal preference data. Analyzer 310 is operable with comparator 314 to query a context 2 store 312 to determine whether there is a match of context 1 and context 2—that is, is the data received from the agent relevant to the local context of the responder 302? If the data is not relevant in context 2, responder 302 is operable to take no further action for this instance of a broadcast. If, however, it is determined by analyzer 310 to be relevant, responder 302 activates available goods/services detection component 318 to query the ambient computing environment 316 to determine if the user's expressed preference can be satisfied by any entity in the ambient computing environment, or at least in the relevant zone of the ambient computing environment. Dependent upon any relevant responses from ambient 316 entities, responder 302 is operable to activate output control 320 to create and emit output 322 as a broadcast to the ambient computing environment. As will be clear to one of skill in the art, output 322 is thus made available, not merely to the original agent, but to any and all entities, whether acting in the role of agent or responder, in the ambient computing environment. This means that, in effect the original agent can be seen as providing an initial stimulus, which may then enable additional interactions by other agents and responders in the ambient computing environment. The original agent's action and the corresponding responses can further cause the ambient computing environment to retain a trace of the preferences and responsive offers, by creating a shared history among the participants that can later be exploited by further agents and responders—for example, a query and its responses may be received and stored by ambient computing entities which, at the time of the original interaction, did not have information about availability of a good or service, and may then later be retrieved if the circumstances change in such a way as to make a new interaction potentially useful.

To further maintain the user's privacy, the original exposable personal preference indicators comprising preference and context information may be treated as ephemeral by the responder, and discarded after being used to create the responder's responsive output 322.

Importantly, the above-described interactions provide a way to maintain the security of a user's private information by causing the agent to broadcast only the necessary amount of data to elicit appropriate responses, and this is done without the necessity for any prior interaction between agents and responders to establish any form of technological security or privacy protocol between them.

Figure 4:
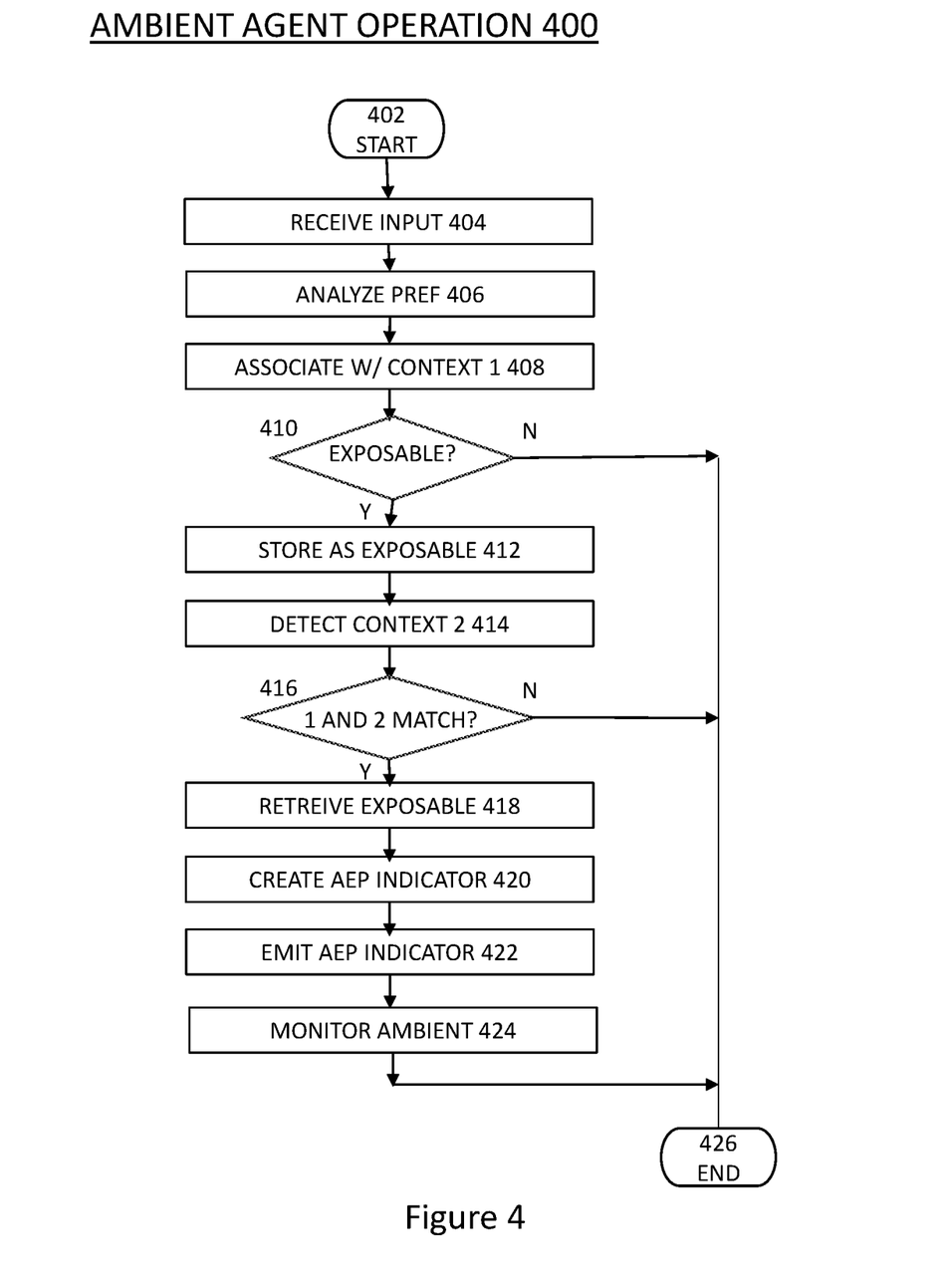
FIG. 4 illustratively shows a flow diagram of the operation of an ambient agent arrangement according to an implementation of the present technology.
Figure 5:
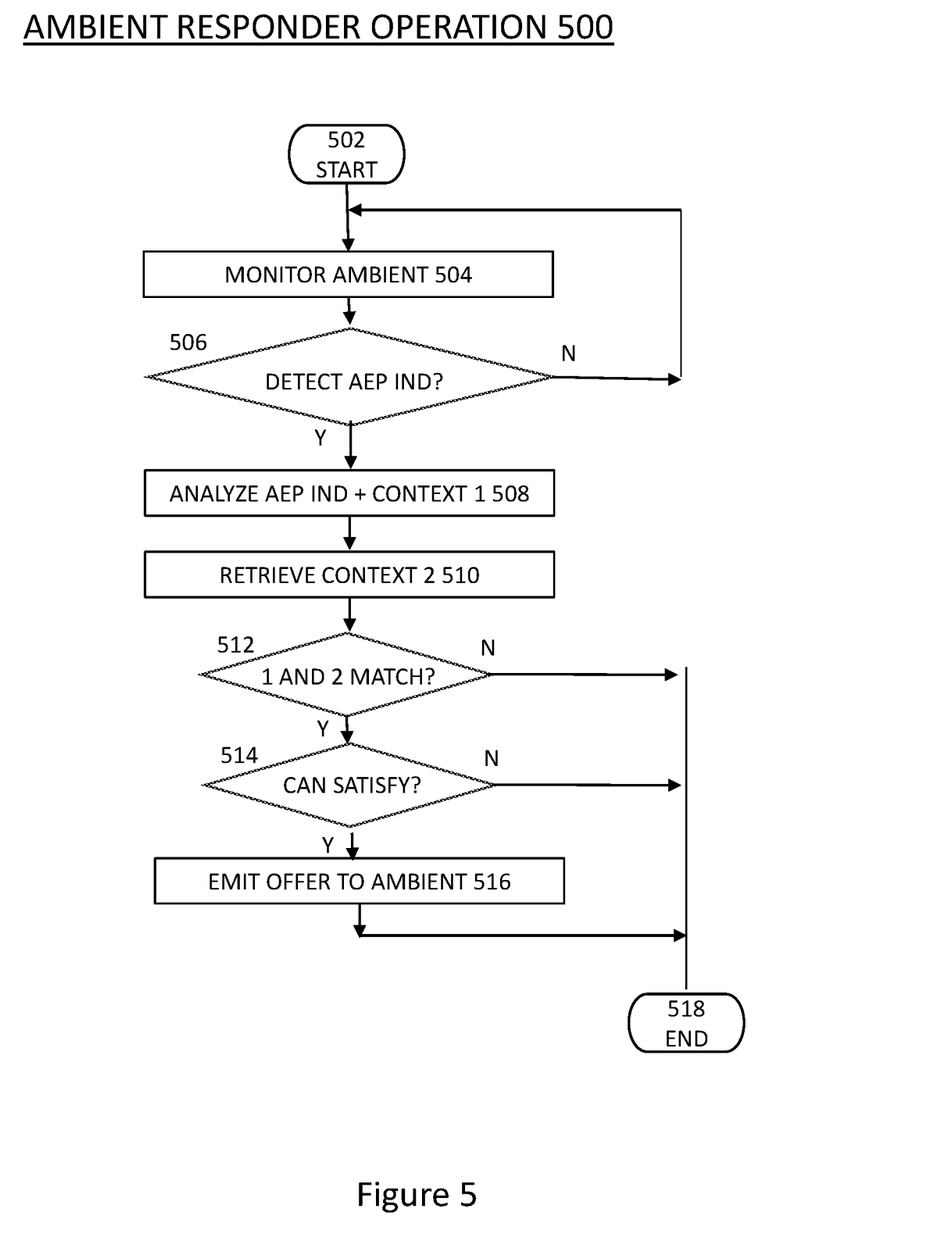
FIG. 5 illustratively shows a flow diagram of the operation of an ambient computing responder arrangement according to an implementation of the present technology.

For better understanding of the operation of the agents and responders according to the present technology, FIGS. 4 and 5 now show, respectively, a flow diagram of the operation 400 of an ambient agent arrangement according to an implementation of the present technology and a flow diagram of the operation 500 of an ambient responder arrangement according to an implementation of the present technology. The ambient agent arrangement and the ambient responder arrangement are operable in the device and zone communication architecture of an ambient computing environment described above with reference to FIG. 1.

FIG. 4 shows the method of operation 400 of the agent beginning at START 402. At 404, the agent receives inputs (which may comprise external inputs and/or inputs from local storage) relating to user preferences and intentions, as has been described above with reference to FIG. 2. At 406, the one or more preferences contained in the input are analyzed and at 408, they are associated with the relevant context indicators of context 1 (that is, the contexts within which the user's preferences are relevant for the purposes of the present technology). At 410 it is determined whether, and to what degree, the preference and context data may be exposed to the ambient environment. There may be, for example, a hierarchy of privacy wherein a user may wish to expose certain preference data in certain external environments in the ambient computing sphere, but may wish to retain other data as private in that external environment. It may, for example, be the case that a user is prepared to expose more personally identifiable data within a trusted environment, such as a work environment, while wishing to retain a greater degree of privacy in a public place, such as a shopping mall. If a preference is determined at 410 not to be exposable, this instance of the process ends at END 426. Of course, as will be clear to one of skill in the art, this ending is only relevant to the current instance, and the process may be restarted (immediately or later) at 402 for another instance of preference and context. If the preference and context 1 data are determined at 410 to be exposable, they are stored in association (such as in a list of ordered pairs) at 412.

If the agent (for example when carried in a mobile device by a user) enters a zone having a detectable context 2, the agent detects the context 2 at 414. The context 2 data is then compared with stored context 1 data in the exposable data store. If no match between context 1 and context 2 is identified at 416, this instance of the process ends at END 426. Of course, as will be clear to one of skill in the art, this ending is only relevant to the current instance, and the process 400 may be restarted (immediately or later) at 402 for another instance of preference and context. If a match between context 1 and context 2 is identified at 416, the agent retrieves the exposable preference information and the associated context 1 data at 418. At 420, the agent constructs an anonymized exposable personal preference indicator with its associated context 1 data, and at 422, the constructed indicator is emitted as a broadcast to the ambient computing environment. The agent then monitors the ambient computing environment for responses at 424, and this instance of the process ends at END 426. Of course, as will be clear to one of skill in the art, this ending is only relevant to the current instance, and the process 400 may be restarted (immediately or later) at 402 for another instance of preference and context.

Turning now to FIG. 5, there is shown a flow diagram of the operation 500 of an ambient responder arrangement according to an implementation of the present technology.

The ambient responder operation begins at START 502, at which point the ambient responder commences monitoring the ambient computing environment—in one example, the ambient responder is a device that establishes a communications zone, typically a wireless communications zone, as described above with reference to FIG. 1. If a broadcast comprising an anonymized exposable personal preference indicator is detected at 506, the response process continues. If no such indicator is detected, the monitoring of 504 continues unless and until the agent is instructed to close the process, or until a positive result is detected at a further instance of 506. Continuing, if a broadcast comprising an anonymized exposable personal preference indicator is detected at 506, the anonymized exposable personal preference indicator and the associated context 1 indicator are analyzed at 508. At 510, the local context—context 2—is retrieved from the responders storage and at 512, context 1 and context 2 are compared to determine a match. If no match is found at 512, this instance of the process ends at 518. Of course, as will be clear to one of skill in the art, this ending is only relevant to the current instance, and the process 500 may be restarted (immediately or later) at 502 for another instance of preference and context. If a match is found at 512, this indicates that the context within which the responder is operating is appropriate to the context within which the user's preference is relevant, and the responder proceeds to 514. At 514, the responder uses the means available to it to determine whether the user's preference can be satisfied by any entity with which the responder is in contact. If the user's preference cannot be thus satisfied, this instance of the process ends at 518. Of course, as will be clear to one of skill in the art, this ending is only relevant to the current instance, and the process 500 may be restarted (immediately or later) at 502 for another instance of preference and context. If it is determined at 514 that the user's preference can be satisfied by an entity in the ambient computing environment with which the responder is in communication, the responder emits the offer as a broadcast to the ambient computing environment at 516, and this instance of the process completes at END 518. Of course, as will be clear to one of skill in the art, this ending is only relevant to the current instance, and the process 500 may be restarted (immediately or later) at 502 for another instance of preference and context.

To further maintain the user's privacy, the original exposable personal preference indicators comprising preference and context information may be treated as ephemeral by the responder, and discarded after being used to create the responder's responsive offer.

An ambient computing environment of the present technology thus comprises ambient agent arrangements in user devices as described above and responder arrangements as described above, operable according to the methods described above, and which may be incorporated into various forms of static or mobile devices. These responders may be themselves operable to offer goods and services, or they may act as repositories or forwarders of anonymised exposable personal preferences, requests and offers on behalf of others.

In ambient agent arrangements according to the present technology, many variant and additional features may be found. For example, operating the personal intelligent agent in an ambient computing environment may comprise carrying a mobile device having the personal intelligent agent installed and operating into an ambient computing zone. Receiving from at least one source may comprise receiving an indicator of an intention of the user. Associating the at least one personal preference with a first context indicator defining a context of the at least one input may comprise associating the at least one personal preference with a temporal context and/or a geographical context.

In one variant, determining whether the at least one personal preference is exposable according to an applicable level of privacy in a graded privacy scheme may comprise checking a level of potential exposure of personally identifiable information against a currently allowable level of privacy in the graded privacy scheme, and the currently allowable level of privacy in the graded privacy scheme may be negotiable by the personal intelligent agent according to a level of a benefit received. Satisfying the preference shown in the anonymous preference indicator may comprises providing a physical good and/or it may comprise providing a service.

In ambient responder arrangements according to the present technology, many variant and additional features may be found. For example, operating the ambient computing environment may further comprise establishing at least one zone having a current local context 2, which may in turn comprise establishing a short range wireless coverage zone. Further, determining that a current local context 2 matches the associated context 1 indicator may comprise referencing a current local temporal context 2. Additionally, or as a variant, determining that a current local context 2 matches the associated context 1 indicator may comprise referencing a current local geographical context. In one implementation, determining whether the exposed personal preference can be satisfied by a provider in the ambient computing environment may comprises referencing a register of providers and/or may comprise polling members of the ambient computing environment to solicit offers by providers.

As will be appreciated by one skilled in the art, the present technique may be embodied as a system, method or computer program product. Accordingly, the present technique may take the form of an entirely hardware embodiment, an entirely software embodiment, or an embodiment combining software and hardware. Where the word "component" is used, it will be understood by one of ordinary skill in the art to refer to any portion of any of the above embodiments.

The functions of the various elements shown in the figures, including any functional elements labelled as a "block," "component," "module" or "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Furthermore, the present technique may take the form of a computer program product embodied in a non-transitory computer readable medium having computer readable program code embodied thereon. The computer readable medium may be a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction-set to high-level compiled or interpreted language constructs.

It will also be clear to one of skill in the art that all or part of a logical method according to embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored using fixed carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, an embodiment of the present technique may be realized in the form of a data carrier having functional data thereon, said functional data comprising functional computer data structures to, when loaded into a computer system or network and operated upon thereby, enable said computer system to perform all the steps of the method.

Those skilled in the art will recognize that the present disclosure has been described by means of examples. The present disclosure could be implemented using hardware component equivalents such as special purpose hardware and/or dedicated processors which are equivalents to the present disclosure as described and claimed.

The techniques further provide processor control code to implement the above-described systems and methods, for example on a general-purpose computer system, on a digital signal processor (DSP), on a graphics processing unit (GPU), on a Neural Processing Unit (NPU), or the like.

The techniques also provide a carrier carrying processor control code to, when running, implement any of the above methods, in particular on a non-transitory data carrier—such as a disk, microprocessor, CD- or DVD-ROM, programmed memory such as read-only memory (firmware), or on a data carrier such as an optical or electrical signal carrier. The code may be provided on a carrier such as a disk, a microprocessor, CD- or DVD-ROM, programmed memory such as non-volatile memory (e.g., Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™, VHDL (Very high speed integrated circuit Hardware Description Language) or SystemVerilog hardware description and hardware verification language. As the skilled person will appreciate, such code and/or data may be distributed between a plurality of coupled components in communication with one another. The techniques may comprise a controller which includes a microprocessor, working memory and program memory coupled to one or more of the components of the system.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended items.

The invention claimed is:

1. A method of operating a personal intelligent agent in an ambient computing environment, comprising:
    receiving at least one input from at least one source;
    analyzing the at least one input to derive a personal preference of a user of the personal intelligent agent;
    associating the at least one personal preference with a first context indicator defining a context of the at least one input;
    determining that the at least one personal preference is exposable according to an applicable level of privacy in a graded privacy scheme;
    responsive to determining that the at least one personal preference is exposable, storing the personal preference as an exposable personal preference with the associated first context indicator in a dedicated store indexed by context indicator;
    detecting that the personal intelligent agent has entered a detectable context and responsively creating a second context indicator;
    determining that there is a match between the second context indicator and the first context indicator in the dedicated store;
    retrieving the exposable personal preference associated with the matched context indicator;
    creating an anonymous preference indicator comprising the exposable personal preference associated with the matched context indicator;
    emitting the anonymous preference indicator anonymously over a communication medium of the ambient computing environment; and
    monitoring the ambient computing environment to detect any broadcast message that indicates ability to satisfy the preference shown in the anonymous preference indicator.

2. The method according to claim 1, wherein operating the personal intelligent agent in an ambient computing environment comprises carrying a mobile device having the personal intelligent agent installed and operating into an ambient computing zone.

3. The method according to claim 1, wherein receiving the at least one input from at least one source comprises receiving an indicator of an intention of the user.

4. The method according to claim 1, wherein associating the at least one personal preference with a first context indicator defining a context of the at least one input comprises associating the at least one personal preference with a temporal context.

5. The method according to claim 1, wherein associating the at least one personal preference with a first context indicator defining a context of the at least one input comprises associating the at least one personal preference with a geographical context.

6. The method according to claim 1, wherein determining that the at least one personal preference is exposable according to an applicable level of privacy in a graded privacy scheme comprises checking a level of potential exposure of personally identifiable information against a currently allowable level of privacy in the graded privacy scheme.

7. The method according to claim 6, wherein the currently allowable level of privacy in the graded privacy scheme is negotiable by the personal intelligent agent according to a level of a benefit received.

8. The method according to claim 1, wherein satisfying the preference shown in the anonymous preference indicator comprises providing a physical good.

9. The method according to claim 1, wherein satisfying the preference shown in the anonymous preference indicator comprises providing a service.

10. A method of operating an ambient computing environment with a communications network having at least intermittent communication with at least one personal intelligent agent, and of operating the at least one personal intelligent agent in the ambient computing environment, the method comprising:
    performing, by the at least one personal intelligent agent, the method of claim 1;
    monitoring the ambient computing environment to detect a message comprising the anonymous preference indicator;
    responsive to detecting the message comprising the anonymous preference indicator, analysing the exposed personal preference and the associated context indicator;
    determining that a current local context matches the associated context indicator;
    responsive to determining that the current local context matches the associated context indicator, determining that the exposed personal preference can be satisfied by a provider in the ambient computing environment; and
    responsive to determining that the exposable personal preference can be satisfied, broadcasting over a communications medium of the ambient computing environment an offer to satisfy the exposed personal preference.

11. The method according to claim 10, further comprising establishing at least one zone having the current local context.

12. The method according to claim 11, wherein establishing the at least one zone comprises establishing a short range wireless coverage zone.

13. The method according to claim 10, wherein determining that the current local context matches the associated context indicator comprises referencing a current local temporal context.

14. The method according to claim 10, wherein determining that the current local context matches the associated context indicator comprises referencing a current local geographical context.

15. The method according to claim 10, wherein determining that the exposed personal preference can be satisfied by a provider in the ambient computing environment comprises referencing a register of providers.

16. The method according to claim 10, wherein determining that the exposed personal preference can be satisfied by a service in the ambient computing environment comprises polling members of the ambient computing environment to solicit offers by providers.

17. The method according to claim 10, wherein satisfying the preference shown in the anonymous preference indicator comprises providing a physical good.

18. The method according to claim 10, wherein the exposed personal preference and the associated context indicator are ephemeral and are deleted after use by the responder.

19. A non-transitory computer-readable storage device comprising computer program code that, when loaded into a processor and executed thereon, causes the processor to perform the method of claim 1.

20. A mobile device comprising a processor and memory storing a personal intelligent agent configured to perform the method of claim 1.

* * * * *